US009687884B2

(12) United States Patent
Chalmers et al.

(10) Patent No.: US 9,687,884 B2
(45) Date of Patent: Jun. 27, 2017

(54) SLAT CLEANING TOOL

(71) Applicant: FEDTECH, INC., Mounds View, MN (US)

(72) Inventors: Eric J. Chalmers, Minneapolis, MN (US); David J. Fox, Ham Lake, MN (US); Brent A. Erickson, Blaine, MN (US)

(73) Assignee: Slatpro LLC, Mounds View, MN (US)

( * ) Notice: Subject to any disclaimer, the term of this patent is extended or adjusted under 35 U.S.C. 154(b) by 355 days.

(21) Appl. No.: 14/541,459

(22) Filed: Nov. 14, 2014

(65) Prior Publication Data

US 2016/0136695 A1    May 19, 2016

(51) Int. Cl.
    *B08B 1/04*    (2006.01)
    *B08B 1/00*    (2006.01)
    *B08B 7/02*    (2006.01)

(52) U.S. Cl.
    CPC ............... *B08B 1/005* (2013.01); *B08B 1/04* (2013.01); *B08B 1/008* (2013.01); *B08B 7/024* (2013.01)

(58) Field of Classification Search
    CPC   B08B 1/005; B08B 1/04; B08B 7/024; B21B 45/04; B21B 45/06; B21C 43/04

USPC .......... 15/93.1, 93.4, 256.5, 256.6; 29/81.05, 29/81.11, 81, 13, 81.16; 198/497–499
See application file for complete search history.

(56) References Cited

U.S. PATENT DOCUMENTS

| | | | |
|---|---|---|---|
| 2,755,708 A * | 7/1956 | Rumsavich | ............... B23C 3/00 15/93.1 |
| 3,075,216 A * | 1/1963 | Wiener | .................... A47L 13/08 15/93.1 |
| 6,437,286 B1 | 8/2002 | Scott | |
| 2011/0146708 A1 | 6/2011 | Janutin et al. | |
| 2013/0098394 A1* | 4/2013 | Fleischer-Pedersen | . B08B 9/023 134/6 |

* cited by examiner

*Primary Examiner* — Mark Spisich
(74) *Attorney, Agent, or Firm* — Nikolai & Mersereau, P.A.; Thomas J. Nikolai

(57) ABSTRACT

A cleaning tool scraps away undesirable slag which has accumulated on opposite sides of the slat of a worktable. The cleaning tool has a pair of cleaning assemblies each comprising a scraping tool. The scraping tools are positioned on opposite sides of a slat for simultaneously cleaning of the two sides of the slat. A single motor rotates both of the scraping tools. A biasing member retains the two scraping tools in close proximity to the slat as it is claimed.

7 Claims, 9 Drawing Sheets

SLAT CLEANING TOOL

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to a slat cleaning tool. More specifically, the present invention relates to a tool for cleaning slag and other accumulated debris from the slats of a work piece support table used to support work pieces.

II. Related Art

Cutting shapes from a work piece such as metal sheets or plates is commonly performed using a beam of energy created by laser or plasma. The work piece is typically supported on a table that consists of narrow, spaced apart slats. Molten material is removed from the cut area or kerf and some is deposited and forms slag on the top and sides of the slats. Slats typically have peaks and valleys which minimizes the possibility of the cut beam contacting the peak and creating a bad mark on the bottom of the work piece. As slag and debris accumulates, an increasing area of the slats contact the bottom of the work piece leading to uneven support which contributes to loss of cut quality and accuracy. The slats therefore need to be replaced or cleaned to eliminate such slag and debris from the support table. Prior art methods and tools used for this purpose have proven to be costly, inefficient and not always effective. Often the slats must be removed from the table for cleaning. There is a real need in the art for a tool which can be employed to quickly and efficiently remove slag from the slats without requiring their removal from the table.

SUMMARY OF THE INVENTION

A cleaning apparatus for simultaneously cleaning opposing side of the slats (also known as "rails") of the support table is disclosed. The cleaning apparatus includes a primary frame and first and second cleaning assemblies. Each of the two cleaning assemblies includes a secondary frame pivotally coupled to the primary frame. Mounted to the secondary frame is a gear train. The gear train includes at least a drive gear and a follower gear. One or more idler gears may be interposed between the drive gear and follower gear. Each of the two cleaning assemblies also includes a tool shaft. One end of the tool shaft is coupled to the follower gear. The other end of the tool shaft is coupled to a scraping tool. The scraping tool comprises a plurality of scraping blades. As such, rotation of the follower gear imparts rotation to the scraping tool. The scraping blades may extend in a direction parallel to the axis of rotation of the tool shaft. Alternatively, the scraping blades may extend in a spiral manner about the axis of rotation of the tool shaft.

The drive gear of the first cleaning assembly and the drive gear of the second cleaning assembly engage each other. Further, at least one biasing member is provided. The biasing member has a first end coupled to the secondary frame of the first cleaning assembly and a second end coupled to the secondary frame of the second cleaning assembly. This biasing member is adapted to force the scraping tools of the first and second cleaning assemblies into cleaning positions adjacent opposite sides of a rail or slat to be cleaned. The biasing member may be a spring having an end pivotally coupled to the first cleaning assembly and a second end pivotally coupled to the second cleaning assembly.

The cleaning apparatus further includes a rotatable drive shaft having a first end coupled to the drive gear of the first cleaning assembly and a second end adapted to be coupled to a motor. The motor rotates the drive shaft which causes the gears of the gear train, the blade shafts and the scraping blades of both the first and second cleaning assemblies to rotate. In some embodiments the blades rotate in opposite directions and impart an upward cleaning action to the opposite sides of the slat or rail being cleaned.

The cleaning apparatus further includes a housing surrounding the frame and the first and second cleaning assemblies. The tool shafts project from the housing and the scraping tools are exterior to the housing. The housing is adapted to rest on the slats and hold the scraping tools at about a 20° angle with respect to the longitudinal axis of the slats. Thus, as the tools are rotated, they rotate upwardly along the sides of a slat causing slag residing along the sides and areas between top teeth of the slats to be removed. A pole projecting from the housing may also be provided. This pole is used to guide the cleaning apparatus along the slats.

A complete understanding of the invention will be obtained from the following description when read in conjunction with the accompanying drawings.

DETAILED DESCRIPTION

This description of the preferred embodiment is intended to be read in connection with the accompanying drawings, which are to be considered part of the written description of this invention. In the description, relative terms such as "lower", "upper", "horizontal", "vertical", "above", "below", "up", "down", "top", and "bottom" as well as derivatives thereof (e.g., "horizontally", "downwardly", "upwardly", etc.) should be construed to refer to the orientation as then described or as shown in the drawings under discussion. These relative terms are for convenience of the description and do not require that the apparatus be constructed or operated in the orientation shown in the drawings. Further, terms such as "connected", "connecting", "attached", "attaching", "joined", and "joining" are used interchangeably and refer to one structure or surface being secured to another structure or surface or integrally fabricated in one piece, unless expressly described otherwise.

Figure 1:
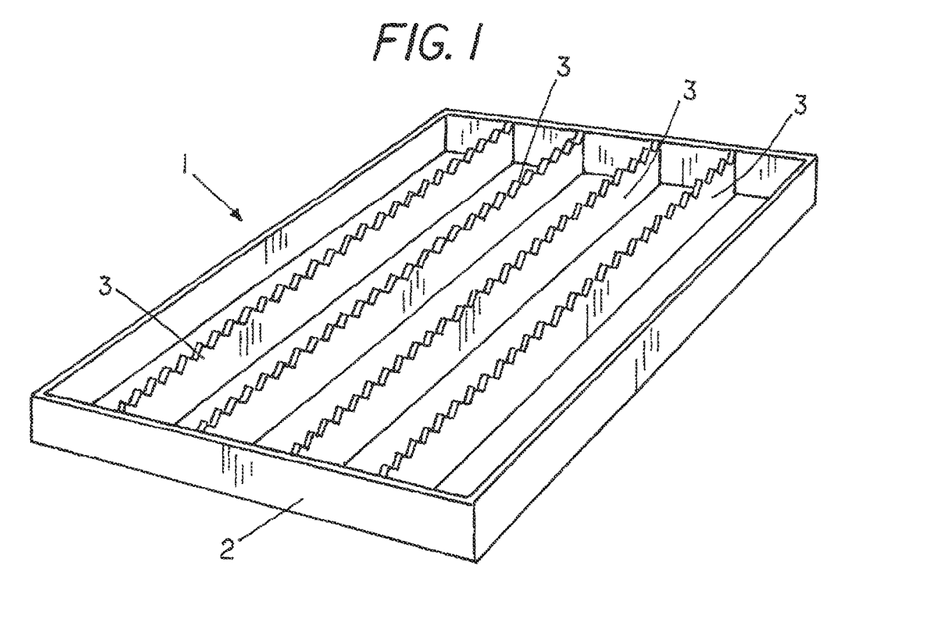
FIG. 1 is a perspective view showing a work table for supporting a work piece, the table having a plurality of slats.
Figure 2:
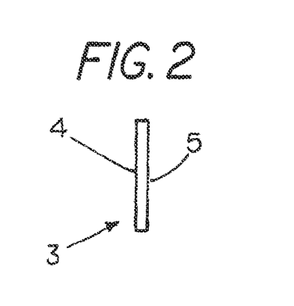
FIG. 2 is an end view of one of the slats of the worktable of FIG. 1.
Figure 3:
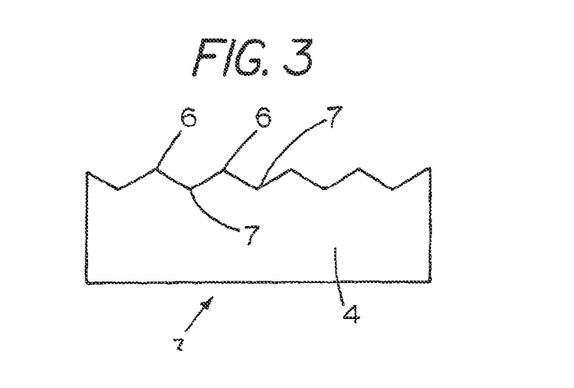
FIG. 3 is a partial side view of a slat having teeth along the top of the slat.

A worktable for supporting a work piece (not shown) is shown in FIGS. 1-3. As illustrated, the worktable includes a table frame 2 which holds and supports a plurality of slats or rails 3. Each slat 3 is an elongate narrow structure having opposing sides 4 and 5. The slats 3 run parallel to each other, but are spaced apart. As shown in FIG. 3, the slats 3 may be provided with a row of teeth 6 having gaps 7 between the teeth.

Worktables of the type shown in FIGS. 1-3 are often used with laser, plasma and other workstations. Such worktables 1 support the work piece above on top of the slats 3 and below the cutting head of the cutting tool. The slats are relatively thin to prevent the support surface from being damaged by the cutting beam after the item being cut has been perforated.

The slats 3 are commonly made of steel. Slag and other debris generated during the cutting operation sticks to the sides 4 and 5 of the slats and in the gaps 7 between teeth 6 formed in the top of the slats 3 making the slats 3 unusable after a very short period of time. While others have tried to address this problem by making slats 3 of materials such as copper to which slag does not readily adhere, this is a very costly solution given the relative price of copper and the steel used when making slats.

FIGS. 4-14 show a tool 10 ideally suited for removing slag simultaneously from the opposing side 4 and 5 and gaps 7 between the teeth 6 of a slat 3. The tool 10 comprises a primary frame 12 and first and second cleaning assemblies 14 and 16.

The primary frame 12 comprises a base plate 20 and two end plates 22 and 24 mounted adjacent or to opposite ends of the base plate 20. End plate 22 has a first mounting hole 26 and a second mounting hole 28. Likewise, end plate 24 has a first mounting hole 26' and a second mounting hole 28'. When the primary frame 12 is assembled, mounting holes 26 and 26' are axially aligned with each other. Likewise, mounting holes 28 and 28' are axially aligned with each other. The base plate 20 may include one or more access openings 30 such as 30 shown in FIG. 9.

Figure 4:
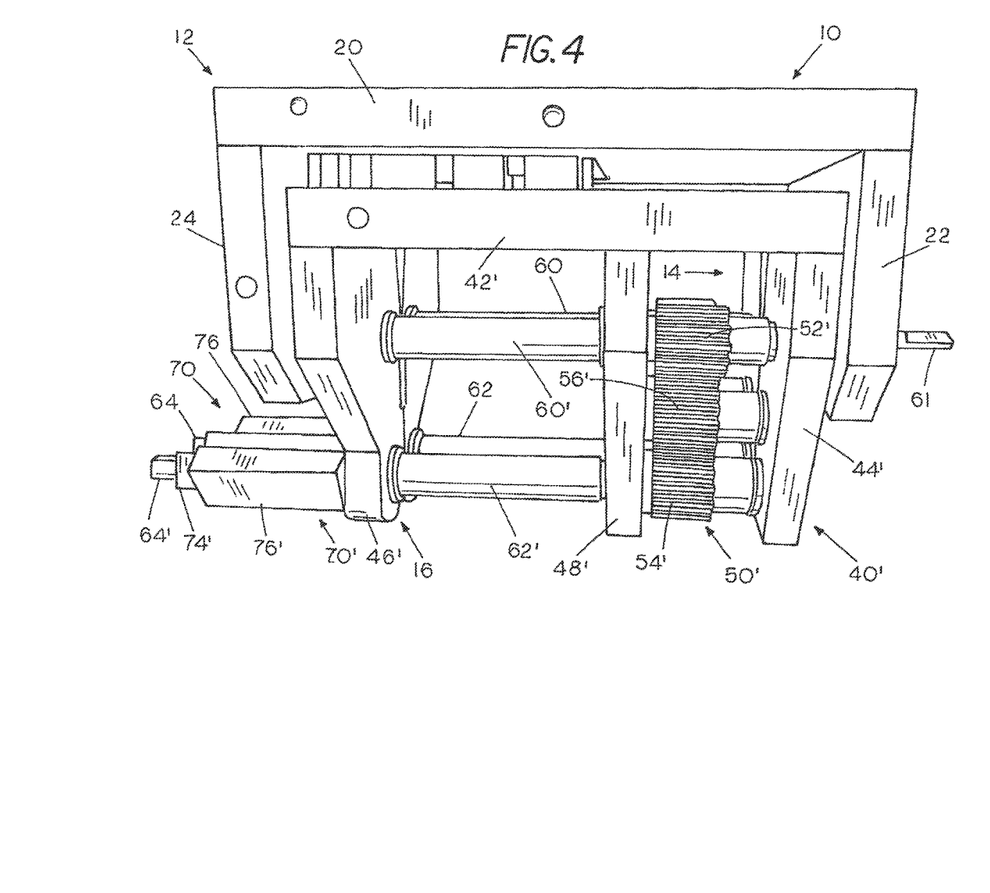
FIG. 4 is a rear view of the slat cleaning apparatus of the present invention.
Figure 5:
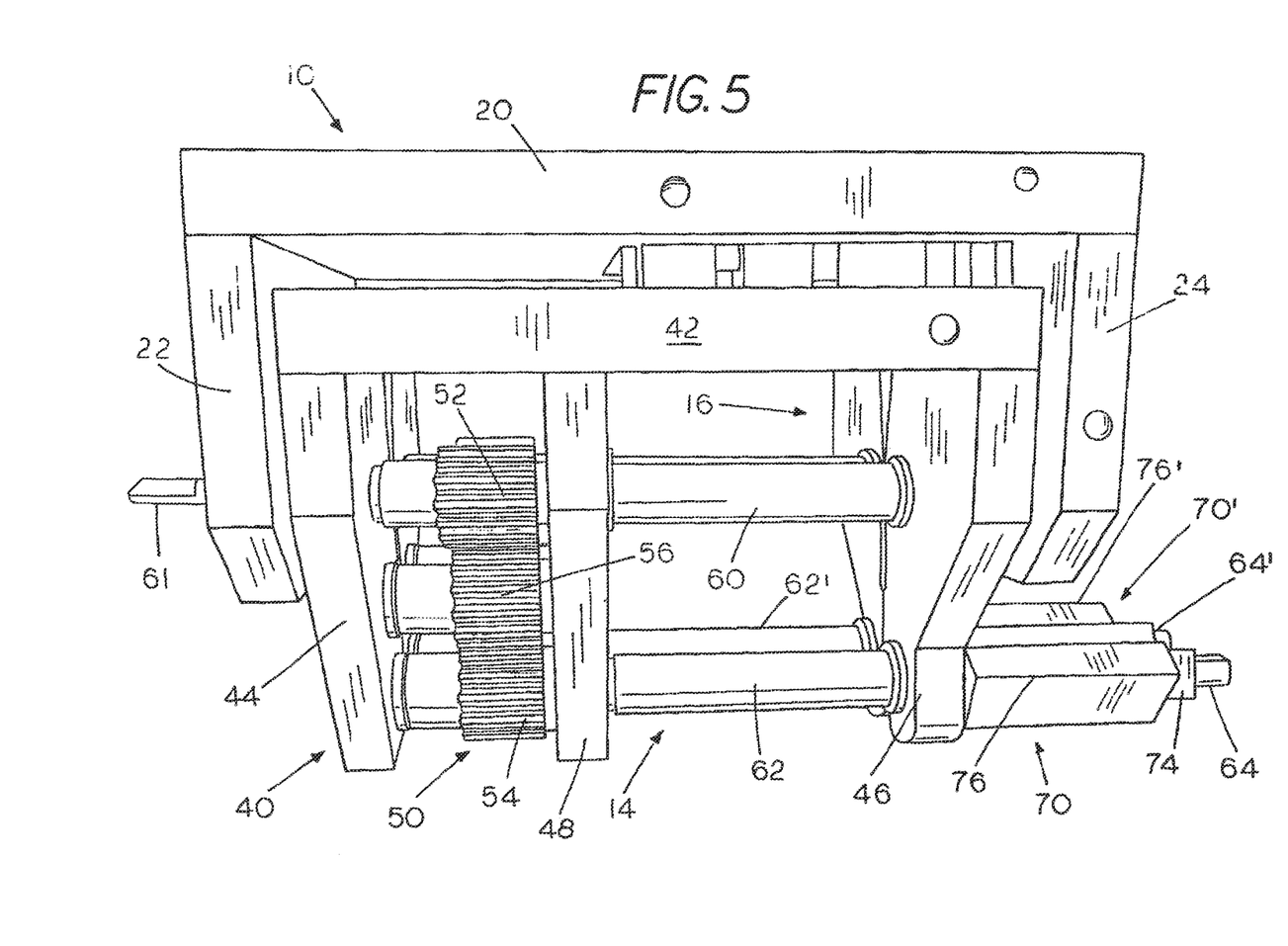
FIG. 5 is a front view of the slat cleaning apparatus of FIG. 3.
Figure 6:
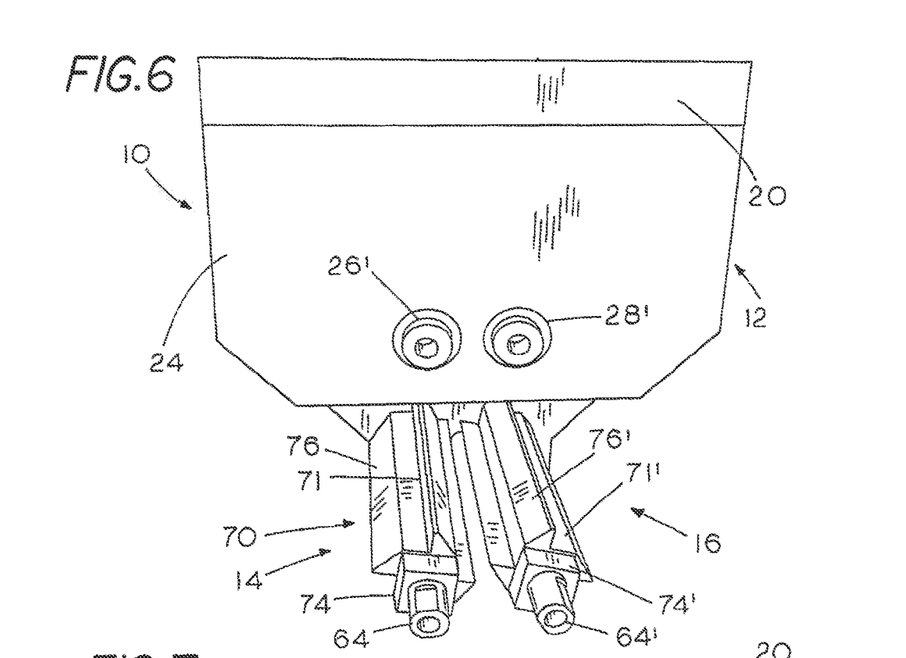
FIG. 6 is an end view of the cutting end of the slat cleaning apparatus of FIG. 3.
Figure 7:
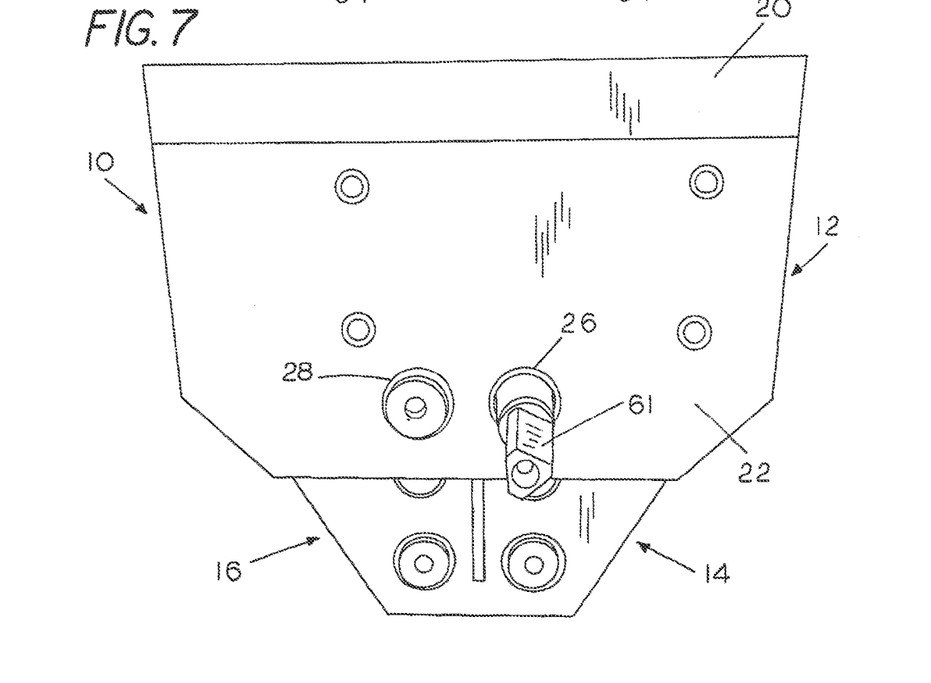
FIG. 7 is an end view of the drive end of the slat cleaning apparatus of FIG. 3.
Figure 8:
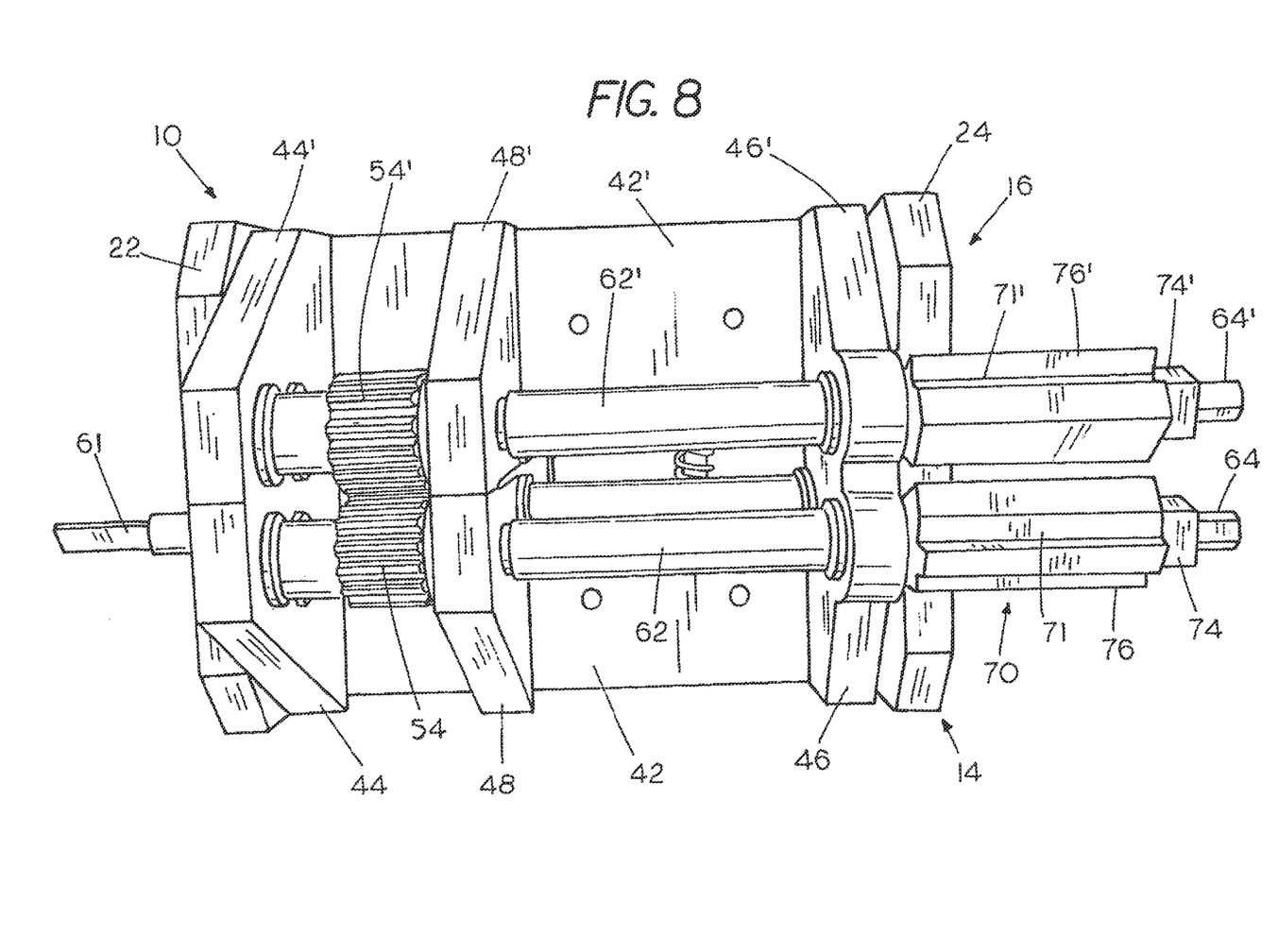
FIG. 8 is a bottom view of the slat cleaning apparatus of FIG. 3.

The two cleaning assemblies 14 and 16 are constructed in a similar fashion, This is perhaps best illustrated in FIGS. 4 and 5. Each of cleaning assemblies 14 and 16 include a secondary frame 40/40'. The secondary frames 40/40' include support plates 42/42'. The secondary frames 40/40' also include drive end plates 44/44', scraping end plates 46/46' and intermediate plates 48/48' extending from the support plates 42/42' in the same direction and in a generally parallel manner.

Each of the two cleaning assemblies 14 and 16 also includes a gear train 50/50'. The gear trains 50/50' are mounted to and between the drive end plates 44/44' and the intermediate plates 48/48'. More specifically, each gear train 50/50' includes a drive gear 52/52' and a follower gear 54/54'. The gear trains 50/50' may also include one or more idler gears such as idler gear 56/56'.

Figures 10, 11:
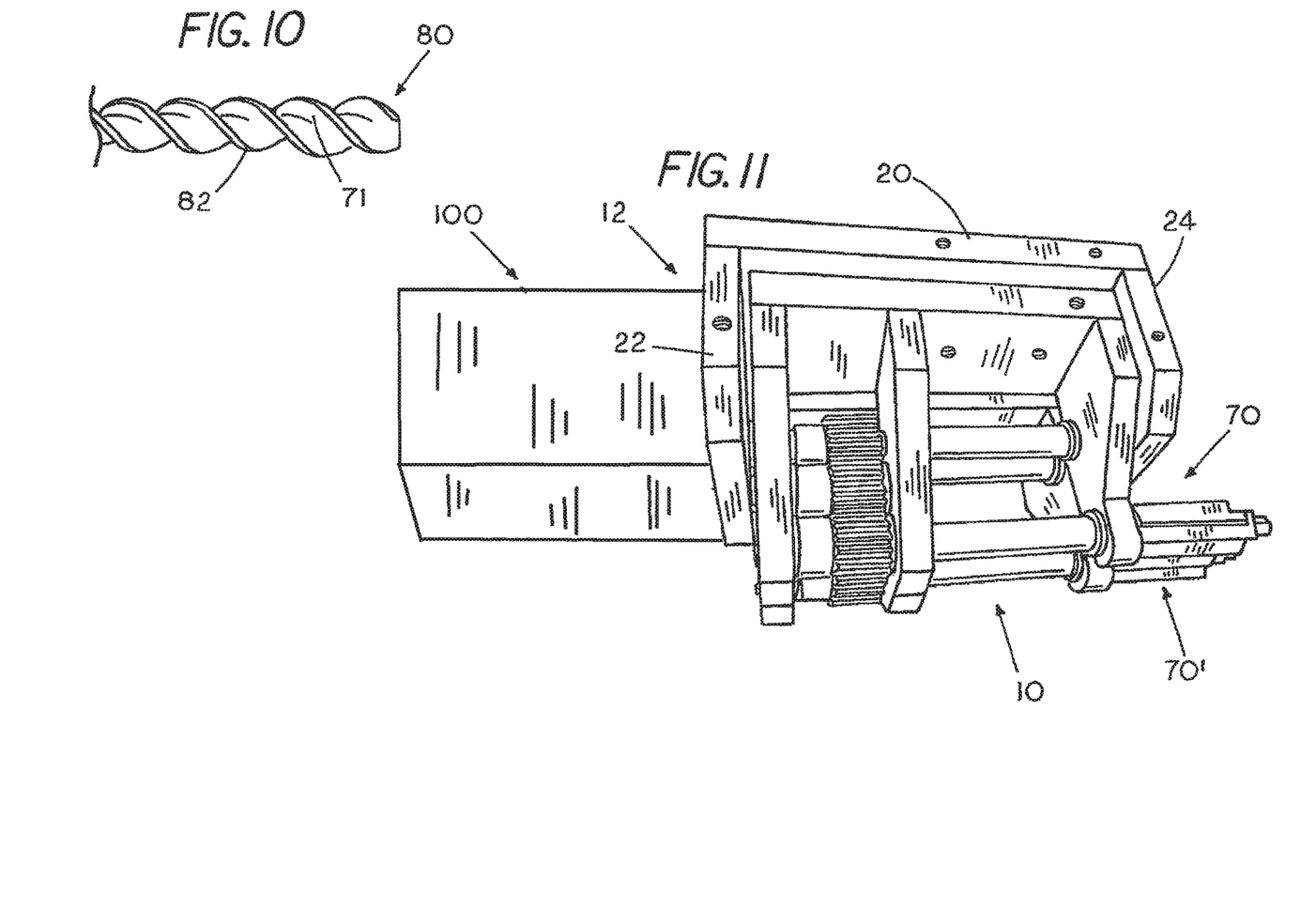
FIG. 10 is a side view of an alternative scraping tool to that shown in FIG. 3.
FIG. 11 is a perspective view of the cleaning apparatus of FIG. 3 coupled to an electric motor.

Drive gear 52 is mounted to and journaled for rotation with a drive shaft 60. The drive shaft 60 extends through axially aligned holes in the drive end plate 44, the scraping end plate 46 and the intermediate plate 48 of the secondary frame 40. The drive shaft 60 also extends through the mounting hole 26 in the first end plate 22 and the mounting hole 28 in the second end plate 24 of the primary frame 12 to pivotally couple the secondary frame 40 to the primary frame 12 between the end plates 22 and 24 of the primary frame 12. Drive shaft 60 may be provided with a shank 61 extending outwardly from the first end plate 22. Shank 61 permits the drive shaft 60 to be coupled to a motor 100. The motor 100 may be the motor of a rotary device such as a drill as shown in FIG. 11. The motor most typically be a motor dedicated to the tool 10 housed in the tool's housing 200 shown in FIGS. 12 and 13. In either case, the motor rotates the drive shaft 60.

Drive gear 52' is mounted to and journaled for rotation with a pseudo drive shaft 60'. The pseudo drive shaft 60' extends through axially aligned holes in the drive end plate 44', the scraping end plate 46' and the intermediate plate 48' of the secondary frame 40'. The pseudo drive shaft 60' also extends through the mounting hole 26' in the first end plate 22 and the mounting hole 28' in the second end plate 24 of the primary frame 12 to pivotally couple the secondary frame 40' to the primary frame 12 between the end plates 22 and 24 of the primary frame 12. Pseudo drive shaft 60' does not, however, include a shank or any other direct driving connection to the motor 100 because the drive gear 52 of the first cleaning assembly 14 engages (i.e., meshes with) the drive gear 52' of the second cleaning assembly 16 such that rotation of the drive gear 52 by the shank 61 and motor 100/200 also causes gear 52' to turn.

The follower gears 54/54' are mounted to and journaled for rotation with a tool shaft 62/62'. Each tool shaft 62/62' extends through axially aligned holes in the drive end plate 44/44', the scraping end plate 46/46' and the intermediate plate 48/48' of the secondary frame 40/40'. The tool shaft 62/62' also includes a scraping tool mounting section 64/64' which extends past the scraping end plate 46/46'.

While the components may be arranged so that the drive gear 52/52' directly drives the follower gear 54/54', the embodiment shown in the drawings include idler gears 56/56'. An idler gear shaft 66/66' is used to couple the idler gears 56/56' to the drive end plate 44/44' and intermediate plate 48/48'. As showed, the drive gears 52/52', idler gears 56/56', and follower gears 54/54' are arranged such that as rotation is imparted by motor 100 to the drive shaft 60, all of the gears turn and rotational motion is also imparted to each of the blade shafts 62/62'.

Various scraping tools 70/70' may be secured to the scraping tool mounting sections 64/64' of the tool shafts 62/62'. One type of scraping tool is shown in FIGS. 4-9 and 11-13. The scraping tools 70/70' have a hollow core 71/71' and a plurality of scraping blades 76/76'. The hollow core is internally keyed to the shape of the scraping tool mounting section 64/64' so that the scraping tools 70/70' spin with the tool shafts 62/62'. The scraping tool mounting sections 64/64' also have a threaded portion. Nuts 74/74' are used to fix the scraping tools 70/70' to the scraping head mounting sections 64/64'. Alternatively, and as shown in FIG. 14, the tool shafts 62/62' may be provided with a threaded bore 300 extending inwardly from the end. The tools 70/70' may include a longitudinal center bore 302 divided into two sections 304 and 306 by a shoulder 308. This arrangement allows the tools 70/70' to be slid over the tool shafts 62/62' and a bolt 310 having threads 312 adapted to mesh with those of the threaded bore 300 and a head 314 to be used to secure the tools 70/70' in place over the shafts 62/62' such that the tools rotate with the shaft. The bolt 310 is tightened using a tool such as a screw driver, Allen wrench, socket wrench or the like and the head 314 is adapted to be tightened and loosened with the tool of choice. The head 314 of bolt 310 firmly engages the shoulder 308 of the tools 70/70' when tightened. As noted above, the scraping tools 70/70' also includes a plurality of scraping blades 76 and 76' extending from the cores 71/71'. The scraping blades are elongate and extend in a direction parallel to the axis of rotation of the tool shafts 62/62'.

An alternate scraping head 80 is shown in FIG. 10, The primary difference is that the blades 82 extend from the core 71 in a spiral manner about the axis of rotation of the tool shafts 62/62'.

Figure 9:
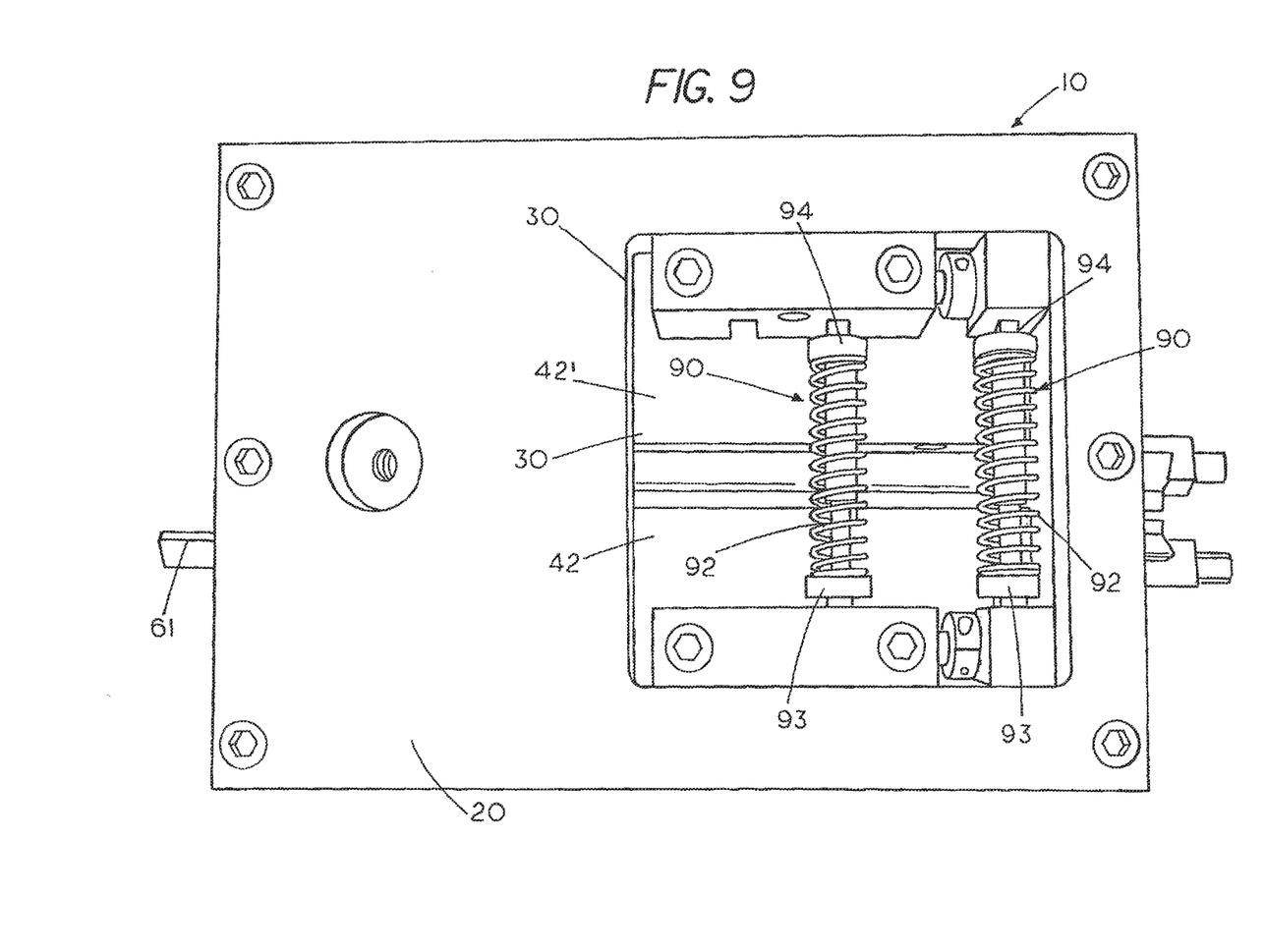
FIG. 9 is a top view of the slat cleaning apparatus of FIG. 3.

As best shown in FIG. 9, and visible through the access opening 30 in base plate 20 of the primary frame 12, are a pair of biasing members 90. Each biasing member 90 is a spring 92 having a first end 93 pivotally coupled to the support plate 42 of secondary frame 40 of the cleaning assembly 14 and a second end 94 pivotally coupled to the support plate 42' of the secondary frame 40' of the second cleaning assembly 16. The biasing members 90 force the scraping heads 70/70' toward each other and into cleaning positions. The scraping heads 70/70' are in their respective cleaning positions there is a gap between them sufficient to receive a slat 3 to be cleaned. As such, the scraping heads are adapted to clean the opposite sides 4 and 5 of a rail 3.

More specifically, the biasing members 90 pivot the first cleaning assembly 14 about drive shaft 60 and the second cleaning assembly 16 about pseudo drive shaft 60' until scraping blades from the scraping tools 70/70' contact the opposite sides 4 and 5 of a slat 3

Figure 12:
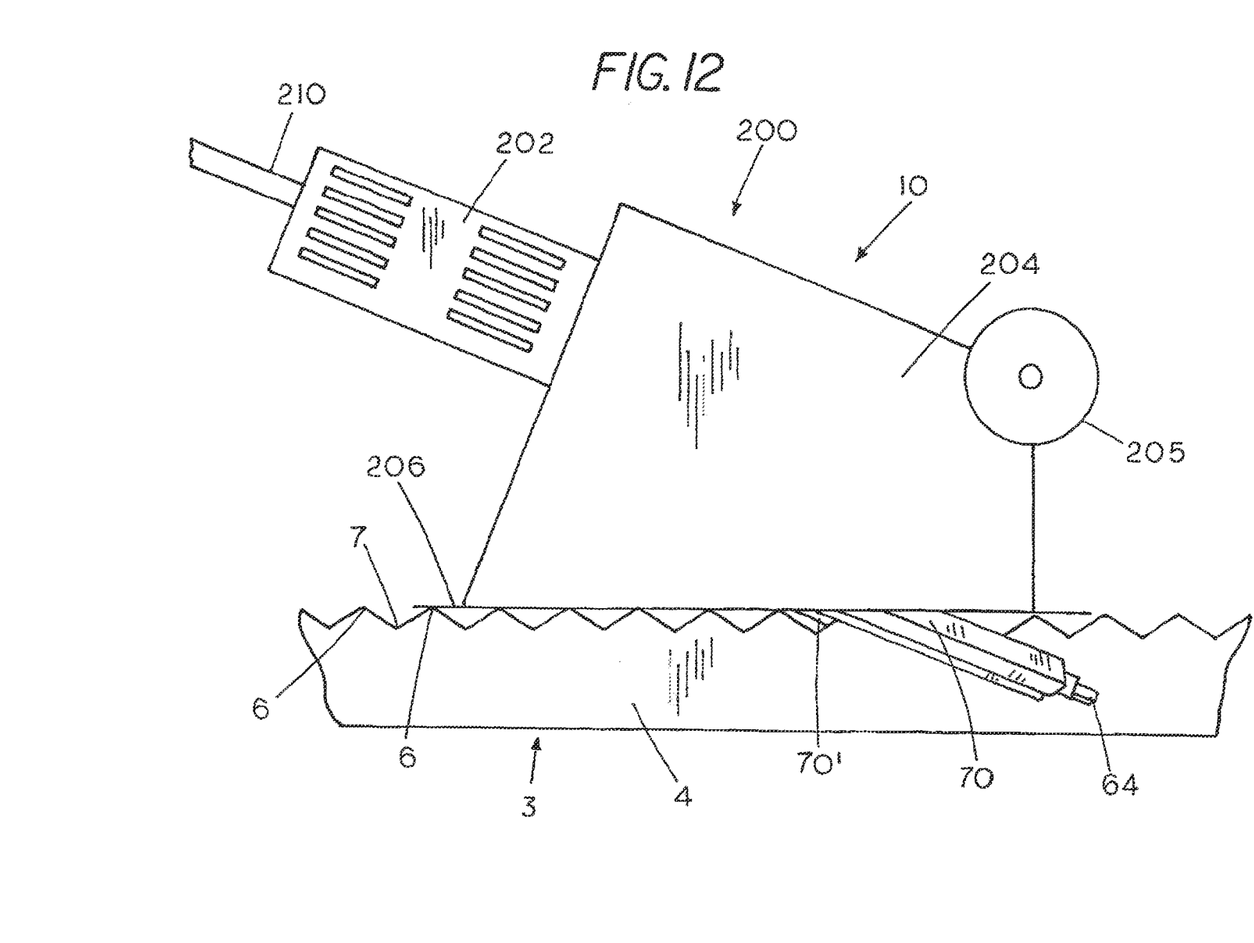
FIG. 12 is a side view of the cleaning apparatus housing with a guiding pole extending from the housing and with a slat located between the scraping tools of the cleaning apparatus.
Figure 13:
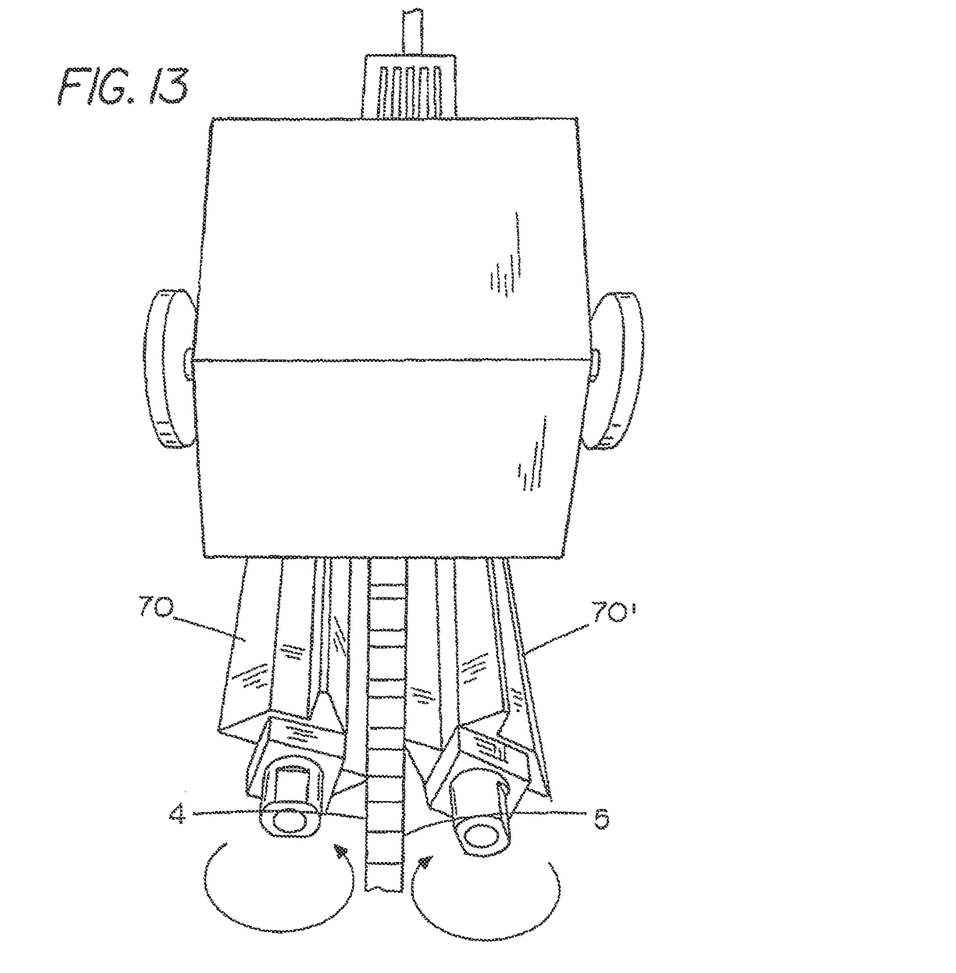
FIG. 13 is an end view of the cleaning apparatus housing with a guiding pole extending from the housing and with a slat located between the scraping tools of the cleaning apparatus.
Figure 14:
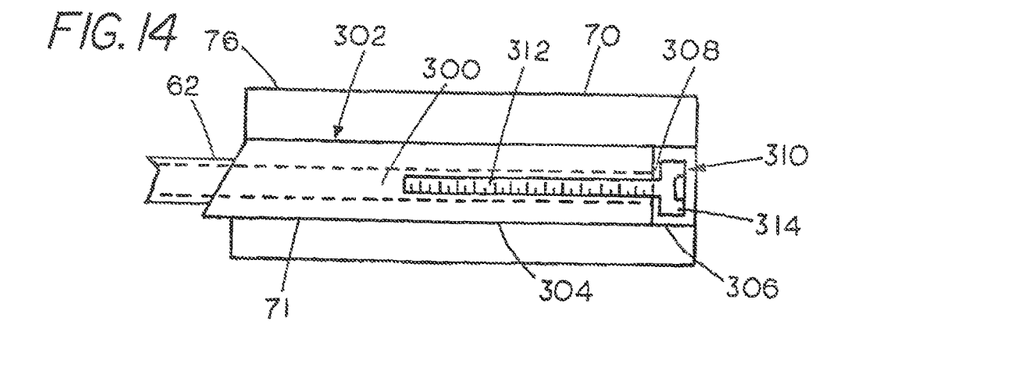
FIG. 14 shows an alternative mechanism for coupling a scraping tool of the cleaning apparatus to the tool shaft in cross section.

The cleaning apparatus 10 typically includes a housing 200 as shown in FIGS. 12 and 13. The housing 200 may be provided with a first compartment 202 which encloses a motor (not shown) and a second compartment 204 which encloses the primary frame 12 and the majority of the two cleaning assemblies 14 and 16. An elongated handle 210 extends from the housing. The housing has openings which permit the scraping tool mounting sections 64/64' of the tool shafts 62/62' to project from the housing 200. The scraping tools 70/70' thus also reside outside of the housing 200. As illustrated, the housing 200 has a bottom surface 206 which is adapted to rest on the slats 3 of the worktable such that the tools 70/70' are held on opposite sides of a slat 3 at an angle of about 22° with respect to the longitudinal axis of the slat 3. This angle may be varied within a range of 5° to 45°. This angle causes the tools 70/70', as they rotate in the directions shown in FIG. 13, to rotate upwardly against the slag on the slats 3 causing the slag, not only along the sides of the slat 3, but also the slag in the gaps 7 between the teeth 6, to be scraped off the slat 3.

The operation of tool 10 will now be described. First, the tool 10 is positioned with respect to a slat 3 to be cleaned such that the slat 3 is between the scraping tools 70/70' as illustrated in FIGS. 12 and 13. As such, one side 4 of the rail 3 is adjacent scraping tool 70 and the other side 5 of rail 3 is adjacent scraping tool 70'. The motor 100 is then energized so as to impart rotation to the drive shaft 60. Drive shaft 60 imparts rotational motion to the drive gear 52. Drive gear 52 imparts rotational motion to idler gear 56 and to drive gear 52'. Idler gear 56 turns follower gear 54 which rotates the tool shaft 62 and, thus, scraping tool 70. Drive gear 52' turns idler gear 56', tool shaft 62' and scraping tool 70'. When viewed as in FIG. 13, scraping tool 70 turns in the counterclockwise direction and the scraping tool 70' turns in the clockwise direction. The housing holds the scraping tools 70/70' at an angle that causes the tools to scrape upwardly along the sides of the slat 3. The turning of the scraping tools 70/70' causes the blades 76 to engage and remove slag on the first side 4 of slat 3 and blades 76' to engage and remove slag on the second side 5 of slat 3. The upward scraping action causes slag, to be removed from the gaps 7 between the teeth 6 of the slat 3. The tool 10 is pushed along the slat 3 using the handle 210 or the handle of the rotary tool motor 100 (depending upon the specific embodiment) to remove the slag from the entire length of the slat 3.

Those skilled in the art will recognize that various modifications and additions may be made without deviating from the invention. By way of example, the idler gears may be eliminated such that the gear trains have only the drive gear and the follower gear. Likewise, additional idler gears may be added. Further, a single biasing member may be used instead of two. Alternatively, more than two biasing members may be employed. The intermediate plate of the secondary frame may be eliminated. The shapes of the blades of the scraping tools may be other than as shown. A housing may be added covering the moving parts of the tool 10 to improve appearance and safety. Likewise, the direction of rotation of the tool shafts and scraping tools may he reversed or otherwise modified so they rotate in the same direction if it is advantageous to do so to accommodate differing cutting head designs. Therefore, the foregoing description is intended to be explanatory and not limiting.

More specifically, it is intended that the foregoing detailed description be regarded as illustrative rather than limiting, and that it be understood that it is the following claims, including all equivalents, that are intended to identify the invention.

What is claimed:

1. A cleaning apparatus for simultaneously cleaning slag from opposing sides and teeth of rails of a support structure, comprising:
   a. a primary frame comprising a pair of spaced apart end plates;
   b. first and second cleaning assemblies, each of said first and second cleaning assemblies comprising (i) a secondary frame coupled to the primary frame and residing between the pair of spaced apart end plates of the primary frame, the secondary frame comprising a drive end plate adjacent a first of said pair of spaced apart end plates of the primary frame and a cutting end plate adjacent a second of said pair of spaced apart end plates of the primary frame, wherein the secondary frames of the first and second cleaning assemblies are pivotally coupled to the primary frame, (ii) a gear train comprising a drive gear and a follower gear, (iii) a tool shaft adapted to rotate about an axis of rotation and extending from a first end coupled to the drive end plate, through the cutting end plate and past a second of said pair of spaced apart end plates of the primary frame, to a second free end, wherein the follower gear is coupled to the rotatable tool shaft adjacent the first end and wherein a scraping tool comprising a plurality of scraping blades is coupled to the second free end, wherein the scraping tools of the first and second cleaning assemblies are adapted to reside in cleaning positions adjacent opposing sides of a rail to be cleaned; and c. a rotatable drive shaft coupled to the drive gear of the first cleaning assembly and having a first end and a second end, the second end adapted to be coupled to and be rotated by a motor, wherein rotation of the drive shaft causes the gears of the gear train, the tool shaft and the scraping tool of both the first and second cleaning assemblies to rotate; and d. at least one biasing member having a first end coupled to the secondary frame of the first cleaning assembly and a second end coupled to the secondary frame of the second cleaning assembly and adapted to force the scraping tools of the first and second cleaning assemblies into a cleaning position adjacent opposing sides of a rail to be cleaned, wherein the biasing member comprises a spring having a first end pivotally coupled to the first cleaning assembly and a second end pivotally coupled to the second cleaning assembly.

2. The apparatus of claim 1 wherein the scraping tools rotate in opposite directions to impart an upward cleaning action to opposite sides of the rail.

3. The apparatus of claim 1 wherein the scraping blades extend in a direction parallel to the axis of rotation of the tool shaft.

4. The apparatus of claim 1 wherein the scraping blades extend in spiral manner about axis of rotation of the tool shaft.

5. The apparatus of claim 1 wherein each gear train also includes an idler gear.

6. The apparatus of claim 1 wherein rotation of the follower gear imparts rotation to the scraping tool.

7. The apparatus of claim 1 wherein the drive gear of the first cleaning assembly and the drive gear of the second cleaning assembly engage each other.

* * * * *